M. J. O'DONNELL.
ADJUSTABLE PIPE FITTING.
APPLICATION FILED FEB. 21, 1912.
1,091,697.
Patented Mar. 31, 1914.
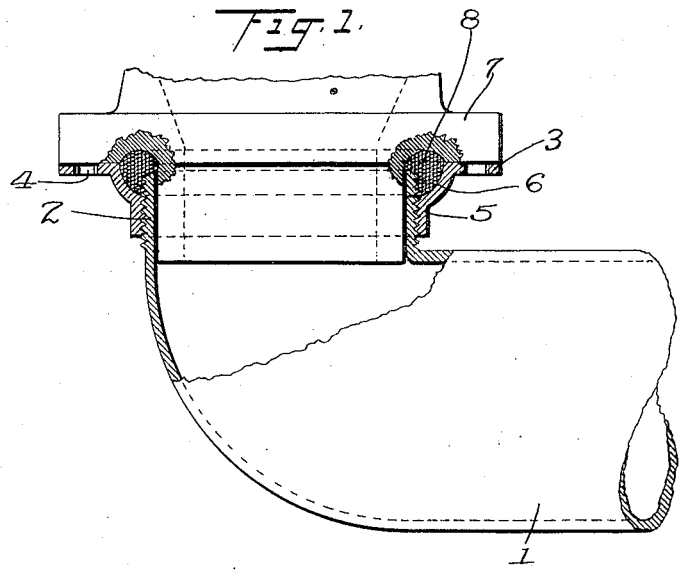
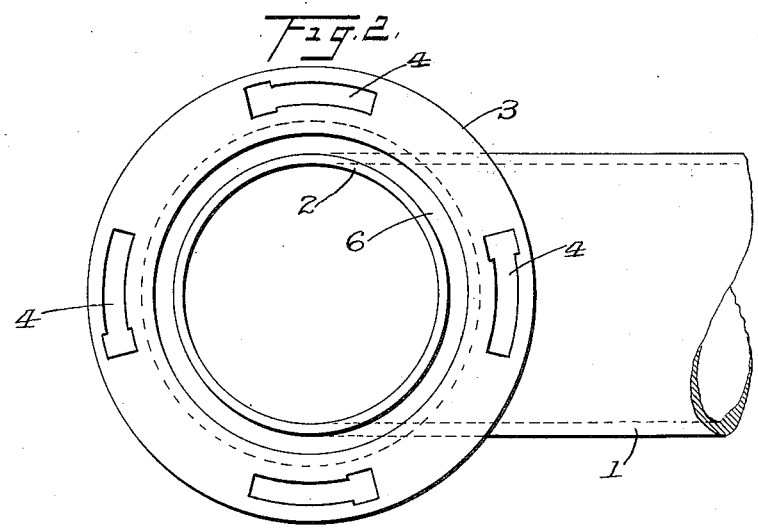

UNITED STATES PATENT OFFICE.

MARTIN J. O'DONNELL, OF CHICAGO, ILLINOIS, ASSIGNOR OF ONE-HALF TO ROBERT J. FARREL, OF CHICAGO, ILLINOIS.

ADJUSTABLE PIPE-FITTING.

1,091,697.  Specification of Letters Patent.  Patented Mar. 31, 1914.

Application filed February 21, 1912. Serial No. 679,116.

*To all whom it may concern:*

Be it known that I, MARTIN J. O'DONNELL, a citizen of the United States, residing at Chicago, in the county of Cook and State of Illinois, have invented certain new and useful Improvements in Adjustable Pipe-Fittings, of which the following is a description.

My invention relates to means for connecting pipes or other tubular devices or for attaching various devices thereto.

The object of my invention is to provide a simple, cheap, convenient and absolutely safe and efficient device of the kind described adapted for use with steam, gas, water or other piping and providing convenient adjustment between the pipe and fitting.

To this end my invention consists in the novel construction, arrangement and combination of parts herein shown and described, and more particularly pointed out in the claims.

In the accompanying drawings wherein like or similar reference characters indicate like or corresponding parts, Figure 1 is a side elevation of a pipe equipped with my improved fitting with parts broken away and removed to show a substantially longitudinal section through the fitting. Fig. 2 is a plan view of my improved fitting.

In the drawings, for the purpose of illustration, I have shown my improved fitting in connection with the main or closet bend of a sewer system as I have found my improved fitting especially valuable for use in this connection.

As shown 1 is the horizontal portion of a closet-bend or sewer pipe having a part 2 at one end bent at substantially right angles to the body portion and adapted to stand in a substantially vertical position. In the form shown the part 2 is threaded upon its exterior to receive my improved fitting which in the present case consists of a flange 3 having a plurality of slots or openings 4 extending therethrough for receiving bolts or screws for connecting another flange or device thereto. A projecting hub 5 is formed at its center provided with suitable threads upon its interior to coöperate with the threads upon the part 2 to adjustably attach the flange and pipe together. An annular depression 6 is provided in the face of the flange 3 extending around the central opening in the flange and arranged to coöperate with a portion of the part 2 projecting beyond the bottom of the depression to form a groove, the outer wall of which is formed upon my fitting and the inner wall upon the part 2 which, if desired may have the threads wholly or partially removed if preferred, so as to provide a substantially smooth surface at this point.

In the drawings I have shown the base of a closet-flange 7 of the ordinary or any preferred form positioned upon and coöperating with the flange 3 in substantially the usual manner and a ring or band of packing 8 is positioned in the groove of sufficient size to fill the same and coöperate with the flange 7 so that when the flanges 7 and 3 are pressed together the packing 8 will be tightly jammed into the groove 6 and between the flanges, thereby forming a fluid tight connection between the flanges, between the pipe and the flange 3 and also between the pipe and the flange 7, thus securing an absolutely tight and safe joint, which may be made with a minimum amount of labor and expense. Obviously when thus constructed the distance between the end of the part 2 and the face of the flange 3 is not of great importance so long as the part 2 projects sufficiently beyond the bottom of the depression 6 to form a satisfactory inner wall for the groove to retain the packing 8 in position, the position of the flange 3 upon the pipe may be adjusted therefore within comparatively wide limits depending, of course, upon the depth of the depression 6 and the nature of the article to be attached to the flange 3. It is also evident that the end of the part 2 may be quite rough or irregular without interfering with the successful operation of the device. The part 2 therefore may be made somewhat longer than actually necessary and cut off in place if desired without the necessity of accurately squaring or smoothing the end.

The intention is to so form the part 2 and flange 3 that they will jointly receive and retain a band of packing in position, and when so positioned the packing will prevent leakage between the pipe 2 and the flange 3, the flange 3 and the flange or part 7 and also primarily between the flange or part 7 and pipe 2.

It is obvious that while my device is shown upon a sewer or drainage pipe, the particular embodiment is shown merely for the purpose of illustration but so long as the above enumerated conditions obtain various slight or immaterial modifications may be made in my device without departing from the spirit of my invention, hence I do not wish to be understood as limiting myself to the exact form or construction shown.

What I claim as new and desire to secure by Letters Patent is:

1. In a device of the kind described, a pipe, a flange mounted at the end of said pipe with the face of said flange positioned slightly beyond the end of said pipe, said flange having an annular groove formed in its face at said pipe, the end of said pipe projecting beyond the bottom of said groove whereby packing positioned in said groove will coöperate jointly with the adjacent faces of the base and nipple of a fitting attached to said flange and projecting into said pipe.

2. In a device of the kind described, a pipe, a flange adjustably mounted at the end of said pipe with the face of said flange positioned slightly beyond the end of said pipe, said flange having an annular groove formed in its face at said pipe, the end of said pipe projecting beyond the bottom of said groove whereby packing positioned in said groove will coöperate jointly with the adjacent faces of the base and nipple of a fitting attached to said flange and projecting into said pipe.

3. In a device of the kind described, a pipe, a flange mounted at the end of said pipe with the face of said flange positioned slightly beyond the end of said pipe, said flange having an annular groove formed in its face at said pipe with the wall of said groove inclined to the face of said flange and to the axis of said pipe, the end of said pipe projecting beyond the bottom of said groove whereby packing positioned in said groove will coöperate jointly with the adjacent faces of the base and nipple of a fitting attached to said flange and projecting into said pipe.

4. In a device of the kind described, an externally threaded pipe, an internally threaded flange mounted at the end of said pipe and adjustable thereon with the face of said flange positioned slightly beyond the end of said pipe said flange having an annular groove formed in its face at said pipe, the end of said pipe projecting beyond the bottom of said groove whereby packing positioned in said groove will coöperate jointly with the adjacent faces of the base and nipple of a fitting attached to said flange and projecting into said pipe.

5. In a device of the kind described, an externally threaded pipe, an internally threaded flange mounted at the end of said pipe and adjustable thereon with the face of said flange positioned slightly beyond the end of said pipe said flange having an annular groove formed in its face at said pipe with the wall of said groove inclined to the face of said flange and to the axis of said pipe, the end of said pipe projecting beyond the bottom of said groove whereby packing positioned in said groove will coöperate jointly with the adjacent faces of the base and nipple of a fitting attached to said flange and projecting into said pipe.

In testimony whereof, I have hereunto signed my name in the presence of two subscribing witnesses.

MARTIN J. O'DONNELL.

Witnesses:
BLANCHE CHALMERS,
BURTON U. HILLS.

Copies of this patent may be obtained for five cents each, by addressing the "Commissioner of Patents, Washington, D. C."